(12) United States Patent
Lakshmin et al.

(10) Patent No.: US 12,541,645 B2
(45) Date of Patent: Feb. 3, 2026

(54) SYSTEMS AND METHODS FOR SENTIMENT ANALYSIS AND CATEGORIZATION

(71) Applicant: State Farm Mutual Automobile Insurance Company, Bloomington, IL (US)

(72) Inventors: Shyam Lakshmin, Rochester, IL (US); Brendon Zee, Tempe, AZ (US); Jeffrey Thomas, Mesa, AZ (US); Arindam Banerjee, Gainesville, GA (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 181 days.

(21) Appl. No.: 18/439,345

(22) Filed: Feb. 12, 2024

(65) Prior Publication Data

US 2024/0273292 A1    Aug. 15, 2024

Related U.S. Application Data

(60) Provisional application No. 63/444,818, filed on Feb. 10, 2023.

(51) Int. Cl.

| | |
|---|---|
| *G06F 40/284* | (2020.01) |
| *G06F 40/30* | (2020.01) |
| *G06F 40/40* | (2020.01) |
| *G06F 40/56* | (2020.01) |
| *G06Q 30/016* | (2023.01) |
| *G06F 40/253* | (2020.01) |

(52) U.S. Cl.
CPC ............ *G06F 40/284* (2020.01); *G06F 40/30* (2020.01); *G06F 40/40* (2020.01); *G06F 40/56* (2020.01); *G06Q 30/016* (2013.01); *G06F 40/253* (2020.01)

(58) Field of Classification Search
CPC ......... G10L 15/22; G10L 15/16; G10L 15/14; G10L 17/18; G10L 17/16; G06F 40/30; G06F 40/40; G06F 40/284; G06F 40/253; G06F 40/211; G06F 40/205; G06F 40/295; G06F 40/279; G06F 40/56; G06F 40/35; G06N 20/00; G06N 3/08; G06N 3/044; G06N 3/0499; G06N 3/09; G06N 5/043; G06N 5/022; G06N 5/025; G06N 10/80
USPC ............................................................ 704/9
See application file for complete search history.

(56) References Cited

U.S. PATENT DOCUMENTS

| | | | |
|---|---|---|---|
| 11,048,712 B2 * | 6/2021 | Chadha | G06F 16/2365 |
| 12,354,146 B2 * | 7/2025 | Sadr | G06Q 30/0621 |
| 2020/0380990 A1 * | 12/2020 | Calegari | G06N 3/105 |
| 2021/0272128 A1 * | 9/2021 | Slawson | G06F 40/169 |

(Continued)

*Primary Examiner* — Vijay B Chawan
(74) *Attorney, Agent, or Firm* — Lee & Hayes, P.C.

(57) ABSTRACT

Described herein are systems and techniques to facilitate efficient determination of operator sentiment based on unstructured textual data exchanged between computing devices via communications channels. Unstructured textual data may be preprocessed to remove extraneous data and prepare the textual content for input to a machine-learned model trained to determine one or more sentiment scores based on textual data. The output of the model may be used to determine sentiment data and/or trends and to determine one or more subsequent actions.

20 Claims, 7 Drawing Sheets

(56) References Cited

U.S. PATENT DOCUMENTS

| | | | |
|---|---|---|---|
| 2021/0342785 A1* | 11/2021 | Mann | G06Q 10/06316 |
| 2022/0292218 A1 | 9/2022 | Zarecki et al. | |
| 2022/0366460 A1 | 11/2022 | Hobart et al. | |
| 2023/0147096 A1* | 5/2023 | Getselevich | G06N 5/041 |
| | | | 704/9 |
| 2023/0259081 A1* | 8/2023 | Cella | G06N 10/60 |
| | | | 706/21 |
| 2023/0351455 A1 | 11/2023 | Zarecki et al. | |
| 2024/0241897 A1* | 7/2024 | Wang | G06F 16/338 |
| 2024/0273292 A1* | 8/2024 | Lakshmin | G06F 40/284 |
| 2025/0045846 A1* | 2/2025 | Strickling | G06V 10/70 |
| 2025/0111168 A1* | 4/2025 | Burnett | G06F 40/30 |
| 2025/0225165 A1* | 7/2025 | Wang | G06N 20/00 |
| 2025/0245417 A1* | 7/2025 | Vasudevan | G06F 40/10 |

* cited by examiner

SYSTEMS AND METHODS FOR SENTIMENT ANALYSIS AND CATEGORIZATION

PRIORITY

This application claims priority to U.S. provisional patent application Ser. No. 63/444,818, filed Feb. 10, 2023, which is incorporated herein by reference.

TECHNICAL FIELD

The present disclosure relates to the determination of user sentiment in electronic communications, and more particularly to determining and categorizing one or more sentiments associated with unstructured data associated with textual electronic communications using one or more models.

BACKGROUND

As communications and computing technologies have advanced, the variety of communication channels available has increased. Today, conversations may occur using voice communication channels, video communication channels, and a variety of types of text-based communication channels. Determining the sentiment (e.g., mood, feelings, attitude, satisfaction (or lack thereof), etc.) of a participant in a voice conversation may be relatively trivial for most human conversation participants, but it may be challenging to determine automatically and/or systematically sentiment of a participant in a conversation by computing systems and components, especially where the conversation is text-based. However, conversation participant sentiment may be valuable information that can improve further interactions with the participant. For example, a business may be able to better and more efficiently interact with a customer if the business has knowledge of the customer's current sentiment (e.g., the customer's sentiment during a conversation with a representative or system of the business). The example systems and methods described herein may be directed toward mitigating or overcoming one or more of the deficiencies described above.

SUMMARY

The systems and methods described herein can facilitate the efficient determination of appropriate data access and configuration of a computing environment to facilitate such access. In examples, the techniques described herein may relate to a method that includes receiving, by an instruction generation system, unstructured textual data and metadata associated with a text communications exchange between a first computing device and a second computing device; preprocessing the unstructured textual data and metadata at the instruction generation system by: determining, based at least in part on the metadata, one or more portions of the unstructured textual data originating with the first computing device; and generating, based at least in part on the one or more portions of the unstructured textual data originating with the first computing device, machine-learned model input data by removing extraneous data from the one or more portions of the unstructured textual data originating with the first computing device and tokenizing the one or more portions of the unstructured textual data originating with the first computing device; executing, at the instruction generation system, a machine-learned model using the machine-learned model input data as input to generate operator data as output; and transmitting, from the instruction generation system to the second computing device, instructions to generate an interface at the second computing device, the interface comprising an interface element comprising a graphical representation of the operator data.

In examples, the machine-learned model may include one or more of a large language model or a convolutional neural network. The methods described herein may also include transmitting, from the instruction generation system to the second computing device, second instructions to generate a second interface element at the interface based at least in part on the operator data. The second instructions may include instruction to present one or more communications channels associated with one or more subsequent communications exchanges between the first computing device and the second computing device. The methods described herein may also include determining, by the instruction generation system, an operator data trend based at least in part on the operator data; and transmitting, from the instruction generation system to the second computing device, second instructions to generate a second interface element at the interface, the second interface element comprising a second graphical representation of the operator data trend. Such methods may include comprising transmitting, from the instruction generation system to the second computing device, second instructions to generate a third interface element at the interface based at least in part on the operator data trend, the third interface element comprising data representing one or more actions determined based at least in part on the operator data trend. Such methods may also, or instead, include generating aggregated operator data based at least in part on the operator data and historical operator data; and transmitting, from the instruction generation system to the second computing device, second instructions to generate a second interface element at the interface based at least in part on the aggregated operator data.

In examples, the techniques described herein may also relate to a non-transitory computer-readable medium comprising instructions that, when executed by one or more processors executing on an instruction generation system configured in a computing environment, cause the one or more processors to perform operations including receiving, by the instruction generation system, unstructured textual data and metadata associated with a text communications exchange between a first computing device and a second computing device; preprocessing the unstructured textual data and metadata at the instruction generation system by: determining, based at least in part on the metadata, one or more portions of the unstructured textual data originating with the first computing device; and generating, based at least in part on the one or more portions of the unstructured textual data originating with the first computing device, machine-learned model input data by removing extraneous data from the one or more portions of the unstructured textual data originating with the first computing device and tokenizing the one or more portions of the unstructured textual data originating with the first computing device; executing, at the instruction generation system, a machine-learned model using the machine-learned model input data as input to generate operator data as output; and transmitting, from the instruction generation system to the second computing device, instructions to generate an interface at the second computing device, the interface comprising an interface element comprising a graphical representation of the operator data.

The machine-learned model may include one or more of a large language model or a convolutional neural network.

Operations described herein may further include transmitting, from the instruction generation system to the second computing device, second instructions to generate a second interface element at the interface based at least in part on the operator data. The second instructions comprise instructions to present one or more communications channels associated with one or more subsequent communications exchanges between the first computing device and the second computing device. Operations described herein may further include determining, by the instruction generation system, an operator data trend based at least in part on the operator data; and transmitting, from the instruction generation system to the second computing device, second instructions to generate a second interface element at the interface, the second interface element comprising a second graphical representation of the operator data trend. Operations described herein may further include transmitting, from the instruction generation system to the second computing device, second instructions to generate a third interface element at the interface based at least in part on the operator data trend, the third interface element comprising data representing one or more actions determined based at least in part on the operator data trend. Operations described herein may further include generating aggregated operator data based at least in part on the operator data and historical operator data; and transmitting, from the instruction generation system to the second computing device, second instructions to generate a second interface element at the interface based at least in part on the aggregated operator data.

In examples, the techniques described herein may also relate to an instruction generation system, that may include one or more processors executing in a computing environment; and a non-transitory memory storing computer-executable instructions that, when executed, cause the one or more processors to perform operations comprising: receiving unstructured textual data and metadata associated with a text communications exchange between a first computing device and a second computing device; preprocessing the unstructured textual data and metadata at the instruction generation system by: determining, based at least in part on the metadata, one or more portions of the unstructured textual data originating with the first computing device; and generating, based at least in part on the one or more portions of the unstructured textual data originating with the first computing device, machine-learned model input data by removing extraneous data from the one or more portions of the unstructured textual data originating with the first computing device and tokenizing the one or more portions of the unstructured textual data originating with the first computing device; executing a machine-learned model using the machine-learned model input data as input to generate operator data as output; and transmitting, to the second computing device, instructions to generate an interface at the second computing device, the interface comprising an interface element comprising a graphical representation of the operator data.

In examples, such operations may further include determining, by the instruction generation system, an operator data trend based at least in part on the operator data; and transmitting, from the instruction generation system to the second computing device, second instructions to generate a second interface element at the interface, the second interface element comprising a second graphical representation of the operator data trend. In examples, such operations may also, or instead, include transmitting, from the instruction generation system to the second computing device, second instructions to generate a third interface element at the interface based at least in part on the operator data trend, the third interface element comprising data representing one or more actions determined based at least in part on the operator data trend. In examples, such operations may also, or instead, include generating aggregated operator data based at least in part on the operator data and historical operator data; and transmitting, from the instruction generation system to the second computing device, second instructions to generate a second interface element at the interface based at least in part on the aggregated operator data. In examples, such operations may also, or instead, include determining one or more actions based at least in part on the operator data; and transmitting, from the instruction generation system to the second computing device, second instructions to generate a second interface element at the interface, the second interface element comprising data representing the one or more actions.

In examples, the techniques described herein may also relate to a system that may include means for receiving unstructured textual data and metadata associated with a text communications exchange between a first computing device and a second computing device; means for preprocessing the unstructured textual data and metadata at the instruction generation system by: determining, based at least in part on the metadata, one or more portions of the unstructured textual data originating with the first computing device; and generating, based at least in part on the one or more portions of the unstructured textual data originating with the first computing device, machine-learned model input data by removing extraneous data from the one or more portions of the unstructured textual data originating with the first computing device and tokenizing the one or more portions of the unstructured textual data originating with the first computing device; means for executing a machine-learned model using the machine-learned model input data as input to generate operator data as output; and means for transmitting, to the second computing device, instructions to generate an interface at the second computing device, the interface comprising an interface element comprising a graphical representation of the operator data.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar and/or identical items.

Figure 1:
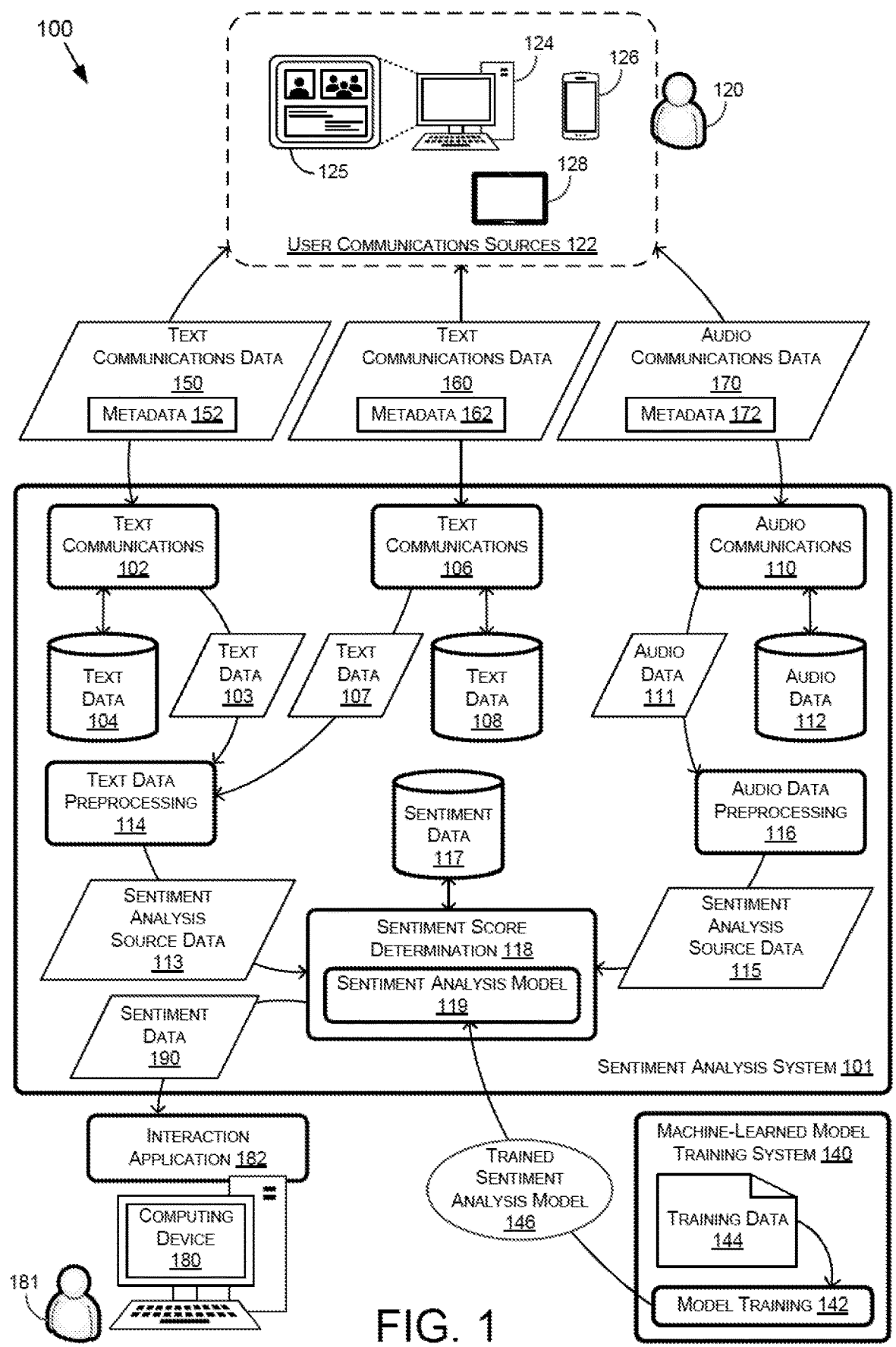
FIG. 1 is a block diagram depicting an example sentiment analysis system and associated components for generating sentiment analysis data, in accordance with examples of the disclosure.

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

A large organization may have multiple human interfaces to their customers or other users of their products and services. For example, an insurance company may have numerous agents, claim handlers, representatives, associates, and/or other individuals who may interact with a customer. An agent may initially establish an insurance policy for a customer, modify the policy over time, and/or sell the customer other products or services. A claims handler or adjuster may address claims submitted by the customer based on the insurance policy. Billing representatives may address customer billing and payment issues. Various other employees or associates of an insurance company may exchange communication with a customer over a variety of topics and issues. The personnel involved in addressing a particular issue and/or communicating with a particular customer regarding such an issue may overlap. For example, a claims handler may address claims issues directly with a customer while the customer's agent may remain involved to oversee the handling of the claim and provide coverage information to the claims handler and/or the customer.

Because the communications exchanged between a first representative of a company and a customer regarding a particular issue may affect the approach to which a second representative of the company may employ in subsequently interacting with the customer, it may be useful to the second representative to have an indication of the customer's sentiment during the interaction with the first representative. As used herein "sentiment" may refer to a user's (e.g., customer's, operator's) mood, feelings, and/or satisfaction with an interaction and/or towards the entity with which the user is interacting. "Sentiment data" may refer to any operator data as described herein, including data representing any sort of sentiment. In various examples, sentiment may be generalized as positive or negative. In such examples, a sentiment score may be used to represent sentiment. A sentiment score may also, or instead, indicate an intensity of emotion. Such sentiment scores may be numerical values within a range of possible numerical sentiment values. For instance, a sentiment score may be any numerical value between −1 and 1, where −1 may represent a completely negative sentiment and 1 may represent a completely positive sentiment. Other ranges and values may also, or instead, be used to represent a sentiment score (e.g., values from 0 to 9, 1 to 10, 1 to 100, etc.). Similar ranges may be used to indicate intensity and/or other attributes that may be associated with sentiment.

In some examples, an intensity score may represent or include two scores, one for sentiment polarity (e.g., along a spectrum of negative to positive) and one for sentiment intensity (e.g., along a spectrum of weak to strong). For example, a sentiment score may be the sum or product of a sentiment polarity score and a sentiment intensity score. Alternatively, a formula or other calculation may be used to determine a sentiment score based on a sentiment polarity score, a sentiment intensity score, and/or one or more other scores.

Currently available computer and telecommunications technologies provide a wide variety of communications means. For example, a customer may communicate with a company representative using a voice call, email, text messages, social media, web interface, and/or in-person. Each such means of communication may include various aspects that may be used to determine sentiment that may differ from aspects used to determine sentiment in other means of communication. For example, a tone of voice may be useful for determining sentiment in a voice call but is unavailable for use in determining sentiment in text messages or email. Similarly, punctuation may be useful in determining sentiment in written or otherwise textual communications but is not available for use in determining sentiment in spoken or vocal communications.

The systems and techniques disclosed herein may be used to determine sentiment for communications exchanges based on unstructured text communications data. Such data may be collected during a communications exchange. For example, an organization may capture and store data representing text messages received from a user (e.g., customer) and data representing replies generated in response to user text messages (e.g., by a representative of the organization, by an automated system, etc.). Such data may be stored with associated metadata that may indicate a time of receipt or generation of the associated textual communications (e.g., a timestamp), device identifying information (e.g., a user device and/or representative device phone number, internet protocol (IP) address, international mobile subscriber identity (IMSI), etc.), a user identifier, a representative identifier, an account number, an issue identifier (e.g., claim number, task identifier, etc.), etc.

A communications exchange may include one or more textual communications exchanged between a user and a representative of an organization or system operated by an organization (e.g., a human representative operating a device or an automated system, referred to interchangeably herein as a "representative"). A communications exchange may be delineated by a timeframe, a lack of communication for a period of time, a combination of devices or systems, a context, an associated issue, and/or any other criteria. For example, a particular communications exchange may include all text messages exchanged during a 24-hour period beginning at the receipt of the first of such text messages. Alternatively, a particular communications exchange may include all text messages exchanged during a time period beginning at the receipt of the first of such text messages and ending after one hour after the last of such text messages (e.g., ending after no further communications have been received for an hour). In another example, a particular communications exchange may include all text messages exchanged between a particular user device and a particular representative device or system (e.g., identified by a phone number, an IP address, a network address, etc.). In still another example, a particular communications exchange may include all text messages associated with a particular task number, claim number, account number, etc.

Any combination of these may also be used to delineate a communications exchange. For example, a particular communications exchange may include all text messages exchanged between a particular combination of user device and representative device during the time period from the initial message exchanged between the combination of devices to 24 hours after the last message exchanged between the combination of devices (e.g., ending after no further communications have been received for an hour).

In various examples, communications exchanges may be stored for further processing. For example, textual communications exchanges, such as a series of exchanged text messages, may be stored as unstructured data, in some examples associated with metadata as described herein. Such communications exchanges may be processed by a sentiment analysis system to determine one or more sentiment scores and/or aggregated sentiment scores. Such scores may be provided to representatives and/or users for informational purposes and/or for assistance in future interactions with a user associated with such scores. Alternatively or additionally, such scores may be used by one or more systems to determine additional data, such as premium estimates, risk estimates, claim estimates, etc.

In examples, a sentiment analysis system may retrieve and process data (e.g., unstructured data and metadata) associated with a particular communications exchange. For example, the system may retrieve data associated with a particular exchange and determine (e.g., based on metadata) one or more identifiers associated with the exchange (e.g., account number, user identifier, representative identifier, claim identifier, task identifier, interaction identifier, etc.). The system may then preprocess the unstructured textual data to generate preprocessed data suitable for additional sentiment analysis which may be referred to herein as "sentiment analysis source data." A sentiment analysis system may be referred to generally as an instruction generation system due to its function of generating instructions for presentation of data and performance of operations based on sentiment analysis as described herein.

In various examples, preprocessing may be performed by a preprocessing function that may be implemented by or include one or more computing devices and/or may be executed, at least in part, by one or more computer processors. The preprocessing function may determine the user portions and representative portions of unstructured data associated with a particular communications exchange. For example, the preprocessing system may identify the unstructured textual data that originated at a user device and the unstructured textual data that originated at a representative device or system. In various examples, such portions may be identified in metadata associated with the unstructured data, such as by device identifiers (e.g., phone number, IP address, etc.) associated with particular portions of unstructured data that the preprocessing function may use to determine whether the portion is associated with a user or a representative. The preprocessing function may generate sentiment analysis source data using the particular portions of unstructured data associated with a user or may otherwise remove the particular portions of unstructured data associated with a representative from the sentiment analysis source data.

The preprocessing function may further process the particular portions of unstructured data associated with the user by removing punctuation, emojis, stop words, extraneous and/or other filler data that may not facilitate, or may hinder, sentiment analysis. For example, the preprocessing function may identify combinations of text that may represent emojis and may remove such text from the unstructured data to be associated with the sentiment analysis source data. Similarly, the preprocessing function may remove returns, empty spaces, etc. The preprocessing function may vectorize, tokenize, lemmatize, or otherwise generate a data structure that may include (e.g., only) words or representations of words in a sequence received from the user as represented in the unstructured data.

The preprocessing function may also, or instead, associate or otherwise determine time information for association with the vectorized, tokenized, or otherwise preprocessed textual data represented in the sentiment analysis source data. For example, the preprocessing function may associate the time stamp of a text message with the tokenized text generated based on that text message. This time information may be used in sentiment analysis as described herein.

The preprocessing function may also, or instead, identify any attachments that may have accompanied the text communications and associate an indication of such attachments with the sentiment analysis source data. In various examples, the preprocessing function may include such attachments as metadata associated with the sentiment analysis source data. Note that in various examples, other preprocessing operations may also, or instead, be performed by a preprocessing function to generate sentiment analysis source data. The operations performed by the preprocessing function may be performed in any order.

Examples of various systems and methods for preprocessing and/or processing text communications data, performing sentiment analysis and other analysis of processed text communications data to determine sentiment scoring data and/or other characteristics of text communications data, and correlating and/or associating text communications data can be found, for example, in U.S. patent application Ser. No. 17/687,983, filed Mar. 22, 2022, and titled "Targeted Transcript analysis and Redaction;" in U.S. patent application Ser. No. 18/347,443, filed Jul. 5, 2023, and titled "Customer Effort Evaluation in a Contact Center System;" and in U.S. patent application Ser. No. 17/744,116, filed May 13, 2022, and titled "Multi-Channel Communication Analysis and Performance;" the contents of each of which is herein incorporated by reference in its entirety and for all purposes.

The sentiment analysis source data may be provided as input to a sentiment analysis model. The sentiment analysis model may be one or more rules-based models of any type executing in any manner, one or more machine-learned models of any type executing in any manner or a combination thereof. For example, the sentiment analysis model may be an open-source model, a proprietary model, or a combination thereof, implemented in one or more neural networks of any type (e.g., a convolutional neural network).

The sentiment analysis model may process the sentiment analysis source data to generate a sentiment score for the associated communications exchange. As noted above, the sentiment score generated as output may be based on a sentiment polarity score, a sentiment intensity score, and/or one or more other scores. In various examples, the sentiment analysis model may determine the output sentiment score based solely on the sentiment analysis source data (e.g., tokenized and/or vectorized unstructured and/or preprocessed textual data), while in other examples, the sentiment analysis model may determine the output sentiment score based on the sentiment analysis source data and one or more pieces of accompanying metadata (e.g., attachments, time information, etc.). The sentiment score may be a numerical value in a range of numerical values representing sentiment. For example, the sentiment analysis model may determine a sentiment score between −1 and 1, 1 and 10, 1 and 100, etc.

In various examples, the sentiment analysis model may determine the output sentiment score based on a sentiment score determined for portions or subsets of the sentiment analysis source data. For example, the sentiment analysis model may determine a sentiment score for individual words, phrases, tokens, or other sections of the sentiment analysis source data and use those sentiment scores to determine an output sentiment score for the sentiment analysis source data. For instance, the sentiment analysis model may sum the sentiment scores for such individual words, phrases, tokens, or other sections of the sentiment analysis source data to determine an output sentiment score.

The one or more sentiment analysis models described herein may be trained using various types of training data. For example, such models may be trained using preconfigured unstructured textual data that has associated sentiment scores (e.g., human-generated and/or automatically generated). Alternatively or additionally, such models may be trained using preconfigured sentiment analysis source data that has associated sentiment scores (e.g., human-generated and/or automatically generated). Other forms of training data may also be used and are contemplated as within the scope of this disclosure.

The sentiment score may then be stored for additional uses, such as those described herein. The sentiment score may be associated with any one or more of the identifiers described herein to facilitate further sentiment analysis and other processing. For example, the sentiment score may be stored and associated with a communications exchange identifier, an interaction identifier, a user account identifier, a user device identifier, a representative identifier, a task identifier, a claim identifier, and/or any other identifier. The sentiment score may also, or instead, be stored and associated with any other metadata, such as a timestamp of sentiment score determination and/or storage.

In various examples, the determined sentiment score may be used to determine one or more aggregated sentiment scores. For example, a particular sentiment score may be used to determine an average sentiment score for a particular customer by averaging all collected sentiment scores (for one communications channel, multiple communications channels, or all communications channels) for all interactions with that customer. In other examples, the system may determine the sentiment scores associated with a particular issue or task associated with a particular customer (e.g., a claim, modifying a policy, etc.) and determine an aggregated sentiment score for that issue or task for that customer. In still other examples, the system may determine the sentiment scores associated with a particular channel of communication associated with a particular customer (e.g., email, text, phone, etc.) and determine an aggregated sentiment score for that channel of communication for that customer. An aggregated sentiment score may be determined using averaging, weighted values (based on any criteria), and/or any formula or other suitable means.

A sentiment score and/or aggregated sentiment score may be provided for use in subsequent interactions with the associated user. For example, when a representative receives a telephone call from a customer, the representative may retrieve (e.g., using a computing system) the sentiment score(s) and/or aggregated sentiment score(s) associated with that customer (e.g., for all channel or for the particular channel currently being used to communicate with the customer). In another example, a representative may evaluate particular sentiment scores and/or aggregated sentiment scores to gauge the health of the organization's relationship with the customer, the amount of interaction required by the customer, etc.

In examples, a sentiment score or aggregated sentiment score may be compared to a threshold to determine whether to implement one or more actions. For example, if a sentiment score is determined that is below a threshold value, the system may be configured to automatically generate a notification to a particular representative (e.g., the customer's agent) so that an effort may be made to improve the relationship with the customer. Conversely, if a sentiment score is determined that is above a threshold value, the system may be configured to automatically generate a notification to a particular representative (e.g., the customer's agent) so that data can be collected from the customer to use in improving other customer relationships, a testimonial may be solicited, review requested, etc.

In various examples, the sentiment score, aggregated sentiment score, and/or associated data may be used to generate training data to further refine the sentiment analysis model. For example, a representative presented with a sentiment score and/or aggregated sentiment score may store and associate a representative-determined sentiment score with data associated with the sentiment score and/or aggregated sentiment score that may then be used for training the model. Alternatively or additionally, a representative may modify the sentiment score and/or aggregated sentiment score associated with an exchange (e.g., based on additional feedback from, or interaction with, the customer) and provide the updated data to the model for further training. Alternatively or additionally, a representative may verify the accuracy of a sentiment score and/or aggregated sentiment score associated with an exchange (e.g., based on additional feedback from, or interaction with, the customer) and mark or otherwise indicate that the sentiment score and/or aggregated sentiment score and related communications exchange data is to be used for training the model. As will be appreciated, additional means of using generated sentiment scores and/or aggregated sentiment scores may be used to generate training data for a sentiment analysis model.

FIG. 1 illustrates an environment 100 in which a sentiment analysis system 101 and associated components may be implemented according to examples of the instant disclosure. The sentiment analysis system 101 may be configured to process communications data of any type and generate sentiment data. The sentiment analysis system 101 may be configured to engage in communications with one or more user devices, applications executing on one or more such user devices, and/or one or more hardware or software components of one or more such user devices. Based on such interactions, the sentiment analysis system 101 may be configured to preprocess associated communications data to prepare such data for processing by a sentiment analysis model that may be trained to generate sentiment analysis data. The sentiment analysis system 101 may provide the generated sentiment analysis data to a customer interaction application for further use, such as for presentation to a user in an interaction application, determination of one or more actions, etc.

For example, a user 120 may interact with the sentiment analysis system 101. The user 120 may be a customer or other user associated with an organization or entity that operates the sentiment analysis system 101. For example, the user 120 may be a customer of an insurance company or bank that operates or is otherwise associated with the sentiment analysis system 101. The user 120 may use one or more of user communications sources 122 to interact with the sentiment analysis system 101. The user communications sources 122 may include devices such as a computer 124, a smartphone 126, and a tablet computer 128. The user communications sources may also, or instead, include software applications and/or interfaces, such as an application 125 executing on computer 124. For example, the application 125 may be a messaging application within a social networking application that may be configured to interact with the sentiment analysis system 101.

Using one or more of the user communications sources 122, the user 120 may interact with the sentiment analysis system 101 using a variety of communications channels. For example, the user 120 may exchange text communications data 150 with a text communications component 102 of the sentiment analysis system 101. The text communications component 102 may be configured to perform communications operations for text communications of a particular type. The text communications component 102 may be configured to generate, monitor, and/or otherwise access communications received from one or more of the user communications sources 122 and transmitted to one or more of the user communications sources 122. Alternatively, the text communications component 102 may be (e.g., only) configured to detect, monitor, and/or otherwise access communications received from one or more of the user communications sources 122.

The text communications data 150 may be text communications of that particular type, such as unstructured text messaging data (e.g., short messaging service (SMS) text data, multimedia messaging service (MMS) text data, etc.), chat application text data, messaging application text data, etc. The text communications data 150 may include metadata 152 that may include or indicate a time of receipt or generation of the associated textual communications (e.g., a timestamp), device identifying information (e.g., for one of the sources 122), a user 120 identifier, a representative identifier, an account number, an issue identifier (e.g., claim number, task identifier, etc.), etc. The text communications data 150 may further include other types of data, such as emojis, images, video, audio clips, etc., that may accompany text communications.

The user 120 may also, or instead, interact with the sentiment analysis system 101 by exchanging text communications data 160 with a text communications component 106 of the sentiment analysis system 101. The text communications component 106 may be configured to perform communications operations for text communications of another particular type (e.g., of a different type than that for which text communications component 102 is configured). The text communications data 160 may be text communications of this other particular type, such as unstructured text messaging data (e.g., SMS text data, MMS text data, etc.), chat application text data, messaging application text data, etc. The text communications data 160 may include metadata 162 that may include or indicate a time of receipt or generation of the associated textual communications (e.g., a timestamp), device identifying information (e.g., for one of the sources 122), a user 120 identifier, a representative identifier, an account number, an issue identifier (e.g., claim number, task identifier, etc.), etc. The text communications data 160 may further include other types of data, such as emojis, images, video, audio clips, etc., that may accompany text communications.

The user 120 may also, or instead, interact with the sentiment analysis system 101 by exchanging audio communications data 170 with an audio communications component 110 of the sentiment analysis system 101. The audio communications component 110 may be configured to perform communications operations for audio communications of any type, such as voice communications (e.g., standard telephone calls, voice over IP calls, internet calls, etc.). Like the text communications described herein, the audio communications data 170 may include metadata 172 that may include or indicate a time of receipt or generation of the associated audio communications (e.g., a timestamp), device identifying information (e.g., for one of the sources 122), a user 120 identifier, a representative identifier, an account number, an issue identifier (e.g., claim number, task identifier, etc.), etc. The audio communications data 170 may further include other types of data, such as emojis, images, video, text, etc., that may accompany text communications.

The communications components of the sentiment analysis system 101 may store the communications data received from the user communications sources 122 and/or generated for transmission to the user communications sources 122 to generate a record of the interactions with the user 120. For example, the text communications component 102 may store such data at a text data store 104, the text communications component 106 may store such data at a text data store 108, and the audio communications component 110 may store such data at an audio data store 112. As described herein, particular interactions may be delineated based on various criteria, including based on data that may be included in metadata, such as timestamps and so forth that may be used to generate a temporal delineation of a particular interaction.

Communications data may be preprocessed by a preprocessing component for further processing by a sentiment analysis model and/or other components. For example, text data 103 may be provided by the text communications component 102 to a text data preprocessing component 114. Text data 103 may include some or all of the text communications data 150 (including, in examples, some or all of the metadata 152) and/or other data determined based on such data. For example, the text communications component 102 may generate or determine an interaction identifier, determine a user identifier, etc., that the text communications component 102 may augment to text data from the text communications data 150 to generate the text data 103. The text communications component 106 may perform similar operations using the text communications data 160 and/or the metadata 162 to generate text data 107 that the text communications component 106 may then provide to the text data preprocessing component 114 for preprocessing. While in this example one text preprocessing component is used for both text communications component 102 and text communications component 106, individual text communications components may have a dedicated preprocessing component and/or may share one or more preprocessing components without departing from the scope of the instant disclosure.

The text data preprocessing component 114 may determine the user portions and representative portions of unstructured data in the text data 103 and/or the text data 107 (e.g., associated with a particular communications exchange or interaction). For example, the text data preprocessing component 114 may identify the unstructured textual data that originated at a user 120's device and the unstructured textual data that originated at a representative device or system. In various examples, the text data preprocessing component 114 may use associated metadata to determine the source of unstructured data, such as by device identifiers (e.g., phone number, IP address, etc.) associated with particular portions of unstructured data that the preprocessing function may use to determine whether the portion is associated with the user 120 or a representative. The text data preprocessing component 114 may generate sentiment analysis source data 113 using the particular portions of unstructured data in the text data 103 and/or the text data 107 associated (e.g., only) with the user 120 or may otherwise remove the particular portions of unstructured data in the text data 103 and/or the text data 107 associated with a representative to generate the sentiment analysis source data 113.

The text data preprocessing component 114 may further process the particular portions of unstructured data in the text data 103 and/or the text data 107 by removing punctuation, emojis, stop words, extraneous, and/or other filler data that may not facilitate, or may hinder, sentiment analysis. For example, the text data preprocessing component 114 may identify combinations of text that may represent emojis and may remove such text from the text data 103 and/or the text data 107 to generate the sentiment analysis source data 113. Similarly, the text data preprocessing component 114 may remove returns, empty spaces, etc. The text data preprocessing component 114 may vectorize, tokenize, lemmatize, or otherwise generate a data structure that may include (e.g., only) words or representations of words in a sequence received from the user 120 as represented in the text data 103 and/or the text data 107.

The text data preprocessing component 114 may also, or instead, associate or otherwise determine time information for association with the vectorized, tokenized, or otherwise preprocessed textual data based on the text data 103 and/or the text data 107 and represented in the sentiment analysis source data 113. For example, the text data preprocessing component 114 may associate the time stamp of a text message with the tokenized text generated based on that text message. This time information may be used in sentiment analysis as described herein.

The text data preprocessing component 114 may also, or instead, identify any attachments that may have accompanied the text communications data 150 and/or the text communications data 160 and associate an indication of such attachments with the sentiment analysis source data 113. In various examples, the text data preprocessing component 114 may include such attachments as metadata associated with the sentiment analysis source data 113. Note that in various examples, other preprocessing operations may also, or instead, be performed by the text data preprocessing component 114 to generate the sentiment analysis source data 113. The operations performed by the text data preprocessing component 114 may be performed in any order.

Preprocessing of audio data 111 may also be performed at an audio data preprocessing component 116. For example, the audio communications component 110 may provide the audio data 111 to the audio data preprocessing component 116. The audio data 111 may include some or all of the audio communications data 170 (including, in examples, some or all of the metadata 172) and/or other data determined based on such data. For example, the audio communications component 110 may generate or determine an interaction identifier, determine a user identifier, etc., that the audio communications component 110 may augment to audio data from the audio communications data 170 to generate the audio data 111. Here again, one audio preprocessing component may be used for multiple audio communications components and vice versa. Moreover, in some examples, audio and text preprocessing functions may be combined in a single component and/or performed by multiple components that each perform both text and audio preprocessing.

The audio preprocessing operations performed by the audio data preprocessing component 116 may include removing pauses, concatenating audio signals and/or clips to generate contiguous audio files, removing exclamations and/or other extraneous audio information, etc. As with text data, the audio data preprocessing component 116 may also, or instead, vectorize, tokenize, lemmatize, or otherwise generate a data structure that may include (e.g., only) words or sounds of words in a sequence received from the user as represented in the audio data. The audio data preprocessing component 116 may associate or otherwise determine time information for association with the vectorized, tokenized, or otherwise preprocessed audio data to generate sentiment analysis source data 115. For example, the audio data preprocessing component 116 may associate a time stamp of an audio clip with an audio excerpt from the clip generated based on that audio clip message. This time information may be used in sentiment analysis as described herein.

The audio data preprocessing component 116 may also, or instead, identify any attachments that may have accompanied the audio communications data 170 and associate an indication of such attachments with the sentiment analysis source data 115. In various examples, the audio data preprocessing component 116 may include such attachments as metadata associated with the sentiment analysis source data 115. Note that in various examples, other audio preprocessing operations may also, or instead, be performed by an audio data preprocessing component 116 to generate the sentiment analysis source data 115. The operations performed by the audio data preprocessing component 116 may be performed in any order.

Preprocessed data, such as sentiment analysis source data 113 based on text data and/or sentiment analysis source data 115 based on audio data may be provided to a sentiment score determination component 118. The sentiment score determination component 118 may include a sentiment analysis model 119, which may be one or more rules-based models of any type executing in any manner, one or more machine-learned models of any type executing in any manner, one or more large language models (LLMs) of any type executing in any manner, or a combination thereof. In examples, the sentiment analysis model 119 may be an open-source model, a proprietary model, or a combination thereof, implemented in one or more neural networks of any type (e.g., a convolutional neural network).

The sentiment score determination component 118 may provide sentiment analysis source data 113 and/or 115 to the sentiment analysis model 119 as input data. The sentiment analysis model 119 may process the sentiment analysis source data 113 and/or 115 to generate, as output, one or more sentiment scores for the communications exchange associated with and/or represented by the input sentiment analysis source data. As noted herein, such scores may include one or more numerical values that may represent one or more respective sentiment attributes, such as, but not limited to, sentiment (e.g., positivity and/or negativity of sentiment) and intensity (e.g., of a determined sentiment). The resulting score(s) generated by the sentiment analysis model 119 and/or any associated data may be stored at a sentiment data store 117 for use in further operations.

In examples, the sentiment score determination component 118 may provide the score(s) generated as output by the sentiment analysis model 119 as sentiment data 190 to a computing device 180 (e.g., to an interaction applications 182 executing on the computing device 180).

Alternatively or additionally, the sentiment score determination component 118 may determine sentiment data 190 for use by the computing device 180 and/or the interaction applications 182 based on the score(s) generated as output by the sentiment analysis model 119. For example, the sentiment score determination component 118 may update a sentiment score associated with the user 120 based on the output of the sentiment analysis model 119. For instance, the sentiment score determination component 118 may aggregate the score(s) generated as output by the sentiment analysis model 119 with past score(s) generated by the sentiment analysis model 119 and, for example, stored at the sentiment data store 117. Such aggregations may be an averaging and/or the use of any other technique, formula, method, etc., to generate a sentiment score or other data for the user 120 based on a (e.g., most recently determined) sentiment score(s). In examples, the determined sentiment score or data may be based on other scores or data collected within a particular time period (e.g., a most recent day, week, month, etc.). Alternatively or additionally, the determined sentiment score or data may be based on an average or aggregated score over the lifetime of a relationship with the user 120. Alternatively or additionally, the determined sentiment score or data may be based on other scores associated with a particular issue or subject associated with the user 120 (e.g., associated with a particular claim, transaction, account, etc.). Other criteria may be used to determine sentiment score(s) and/or data and are contemplated as within the scope of the instant disclosure.

The resulting sentiment data may be provided as sentiment data 190 to one or more computing devices and/or one or more applications and/or services executing on one or more computing devices or systems (e.g., a cloud-based application or service). For example, the computing device 180 may be a computer or computing system operated by a user 181 that may be a representative or other individual associated with the organization with which the sentiment analysis system 101 is associated. The user 181 may be tasked with communicating with the user 120 using one or more communications channels, such as text and/or audio communications. The interaction application 182 executing on the computing device 180 may facilitate such interactions by generating an interface that includes one or more indications of the sentiment data 190. The user 181 and/or the application 182 may use such indications and/or associated sentiment data to determine a means of communicating with the user 181 and/or one or more approaches for such communications.

For example, sentiment data indicating that the user 120's current sentiment is very negative may cause the interaction application 182 to present a user interface element suggesting that a voice call may be the best form of initiating communication with the user 120. In another example, sentiment data indicating that the user 120's sentiment is trending positive over time may cause the interaction application 182 to present a user interface element suggesting that a test message to check in with the user 120 may be appropriate. In other examples, the sentiment data presented by the applications 182 may be used by the user 181 to determine an approach to responding to incoming communications from the user 120. As will be appreciated, sentiment data may be useful for many purposes in user (e.g., customer) interaction scenarios.

The sentiment analysis model 119 may be a trained sentiment analysis model generated by a machine-learned model training system 140. For example, the machine-learned model training system 140 may use training data 144 to execute a model training component 142 to generate a trained sentiment analysis model 146. The training data 144 may be any of a variety of types of training data. For example, the training data 144 may be unstructured textual data that has associated sentiment scores (e.g., human-generated and/or automatically generated). Alternatively or additionally, the training data 144 may be sentiment analysis source data that has associated sentiment scores (e.g., human-generated and/or automatically generated). Other forms of training data may also be used and are contemplated as within the scope of this disclosure. The trained sentiment analysis model 146 may be configured at the sentiment score determination component 118 as the sentiment analysis model 119.

Figure 2:
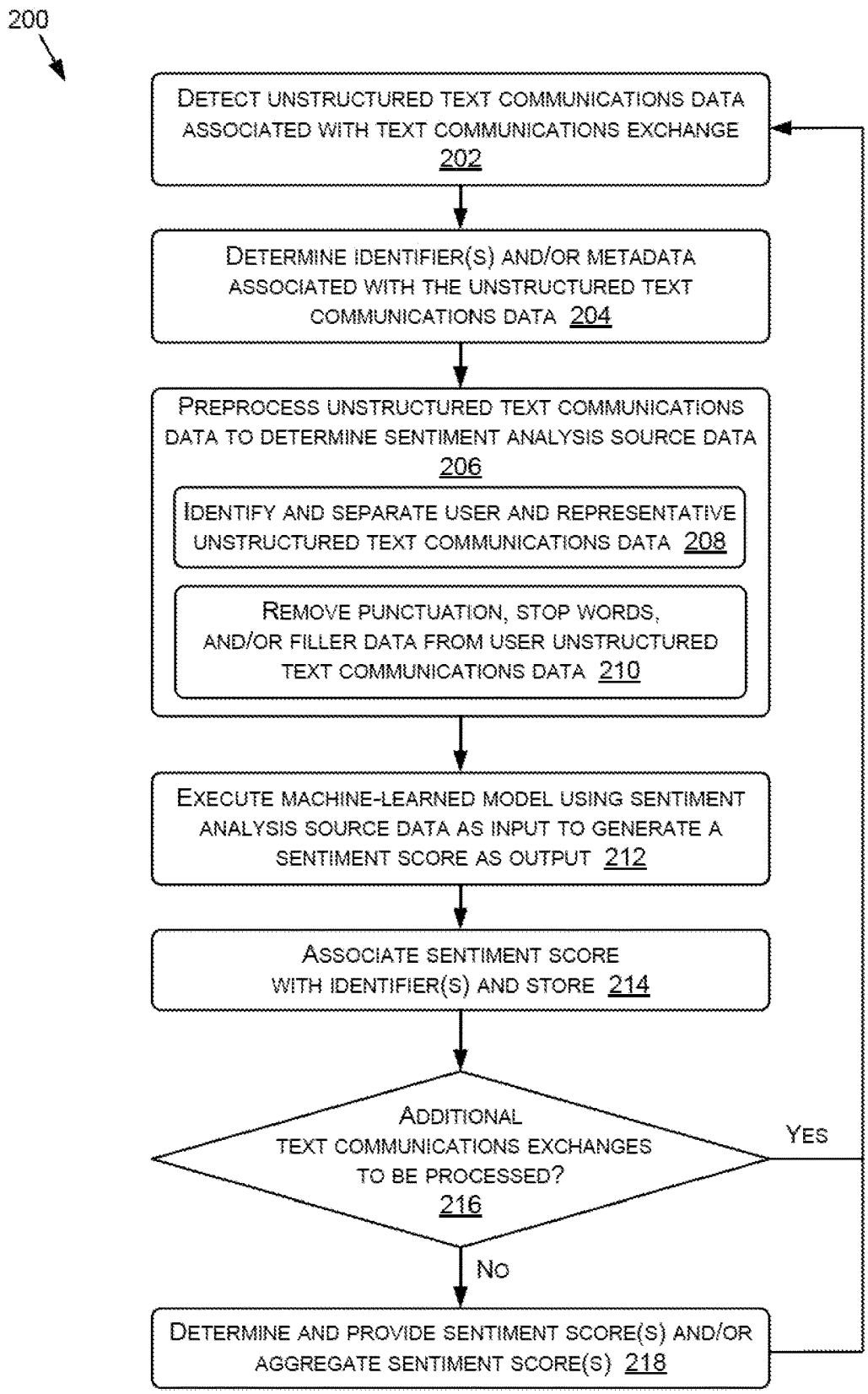
FIG. 2 is a flow diagram illustrating an example process for generating sentiment analysis data in a sentiment analysis system, in accordance with examples of the disclosure.

FIG. 2 illustrates an exemplary process 200 that may be implemented at a sentiment analysis system such as that described herein. At 202 unstructured text communications data associated with a text communications exchange may be detected. In various examples, unstructured text communications data may be processed by a sentiment analysis system in response to the system determining that the associated communications exchange is complete (e.g., based on the criteria described herein). Alternatively or additionally, the sentiment analysis system may periodically process unstructured text communications data associated with communications exchanges. For example, once an hour, day, week, etc., the system may identify and process unprocessed unstructured text communications data generated since the previous processing operations were performed.

At 204, the sentiment analysis system may determine one or more identifiers associated with the unstructured text communications data and/or metadata associated with the unstructured text communications data. In examples, the system may use this data to perform the preprocessing of subsequent operations and/or other processing. The system may also, or instead, use this information to initialize the data structure to be used to store the sentiment analysis source data and associated data by, for example, associating one or more identifiers with metadata that will be associated with the sentiment analysis source data.

At 206, the sentiment analysis system may perform one or more preprocessing operations to generate sentiment analysis source data. For example, the sentiment analysis system may include a preprocessing function that may be configured to identify and separate the portions of the unstructured text communications data associated with the user from those portions associated with the representative at 208. The preprocessing function may also, or instead, remove punctuation, filler data, etc. from the portion of the unstructured text communications data associated with the user and vectorize, tokenize, or otherwise prepare the unstructured text communications data associated with the user to generate sentiment analysis source data at 210.

At 212, the sentiment analysis system may provide the sentiment analysis source data to a sentiment analysis model as input. Further at 212, the system may execute the model to generate a sentiment score as output. As noted herein, the sentiment score may be a numerical value in a range of values representing a sentiment for the communications exchange associated with the sentiment analysis source data. At operation 214, the sentiment score may be stored and/or associated with the identifiers and/or other metadata associated with the unstructured text communications data associated with the user.

At 216, the system may determine whether there are additional communications exchanges to be processed by the sentiment analysis system. For example, the system may be configured to periodically process data associated with communications exchanges and, at 216, may determine if any such exchanges remain unprocessed for the current period. Alternatively or additionally, the system may be configured to process data associated with communications exchanges upon detection of such exchanges and, at 216, may determine if any additional such exchanges have been detected. If there are additional communications exchanges to be processed, the process 200 may return to 202 to detect and begin processing unstructured text communications data for one or more additional communications exchanges.

If there are no further additional communications exchanges to be processed, at 218, the system may determine and provide the sentiment score determined at 212 and/or one or more associated sentiment scores. For example, the sentiment score(s) generated in process 200 may be provided to one or more representatives for use in interactions with a customer associated with such scores. Additionally or alternatively, the system may determine one or more aggregate sentiment scores at 218. Such sentiment score(s) may also, or instead, be provided to one or more representatives for use in interactions with a customer associated with such scores. As described herein, such scores and aggregate scores may also be used in other operations and processing.

Figure 3:
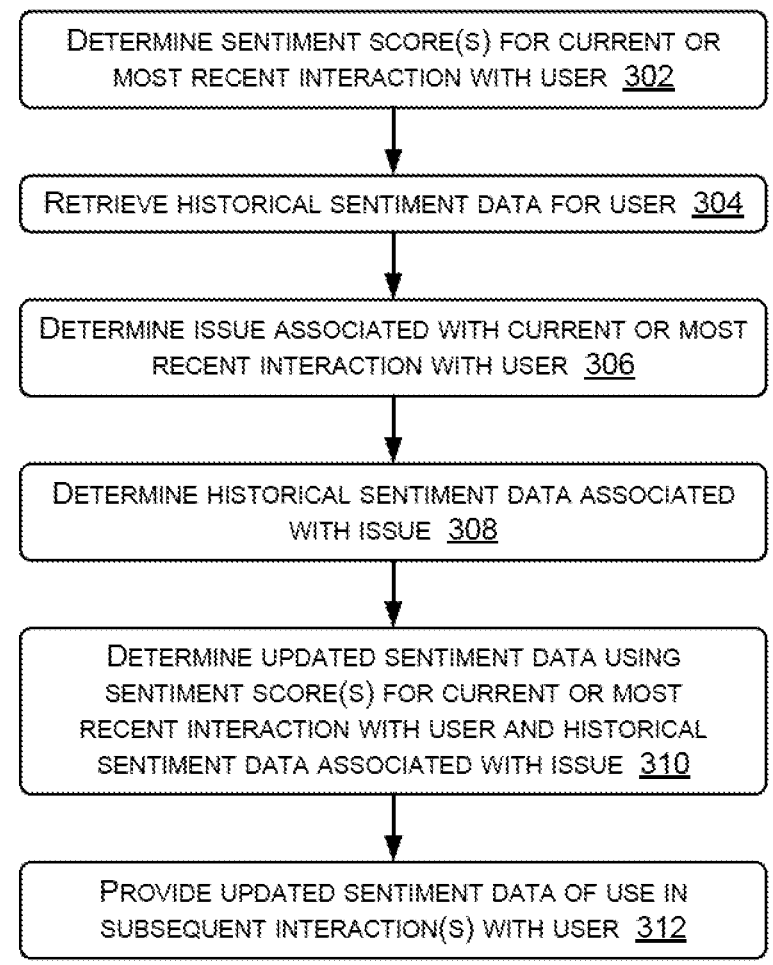
FIG. 3 is a flow diagram illustrating another example process for generating sentiment analysis data in a sentiment analysis system, in accordance with examples of the disclosure.

FIG. 3 illustrates an exemplary process 300 for determining current sentiment data using current sentiment score(s) and historical sentiment data that may be implemented at a sentiment analysis system such as that described herein. At 302, one or more sentiment scores (e.g., one or more scores for sentiment and/or intensity) may be determined for a current, ongoing, and/or most recent interaction with a user (e.g., as described herein, such as by a sentiment analysis model). The sentiment score(s) may be associated with a particular user and identifier by an accompanying identifier associated with that user (e.g., in metadata).

At 304, the system may identify and retrieve other (e.g., historical) sentiment data for the user associated with the sentiment score(s) determined at 302. This may include processed sentiment data, such as aggregated and/or averaged sentiment data based on previously determined sentiment scores and/or other sentiment data.

In examples, a user may have more than one set of sentiment data. Each set of such sentiment data may be associated with a particular issue. As used herein, an "issue" may be any issue, topic, or subject that may be associated with a user, such as a claim, a complaint, a transaction, etc. At 306, the system may determine the particular issue with which the sentiment score(s) determined at 302 are associated. In examples, an individual issue may have an associated (e.g., alphanumeric) identifier, such as a claim number, transaction identifier, account number, complaint identifier, etc.

At 308, the system may determine, from the other (e.g., historical) sentiment data retrieved at 304, a subset of such data that corresponds to the particular issue identified at 306 (e.g., associated with the sentiment score(s) determined at 302).

At 310, the system may use this subset of other (e.g., historical) sentiment data along with the recently determined sentiment score(s) of 302 to update the sentiment data associated with the user and/or the issue. For example, the system may average a newly determined sentiment score into a previously averaged sentiment score to determine an updated averaged sentiment score. Alternatively or additionally, the system may execute an algorithm or perform other operations to determine an updated aggregated sentiment score using a newly determined sentiment score and previously determined sentiment scores and/or other sentiment data.

At 312, the system may provide this updated sentiment data for use in subsequent operations, including further interactions with the user and/or for use in generating a user interface to facilitate additional communications.

Figure 4:
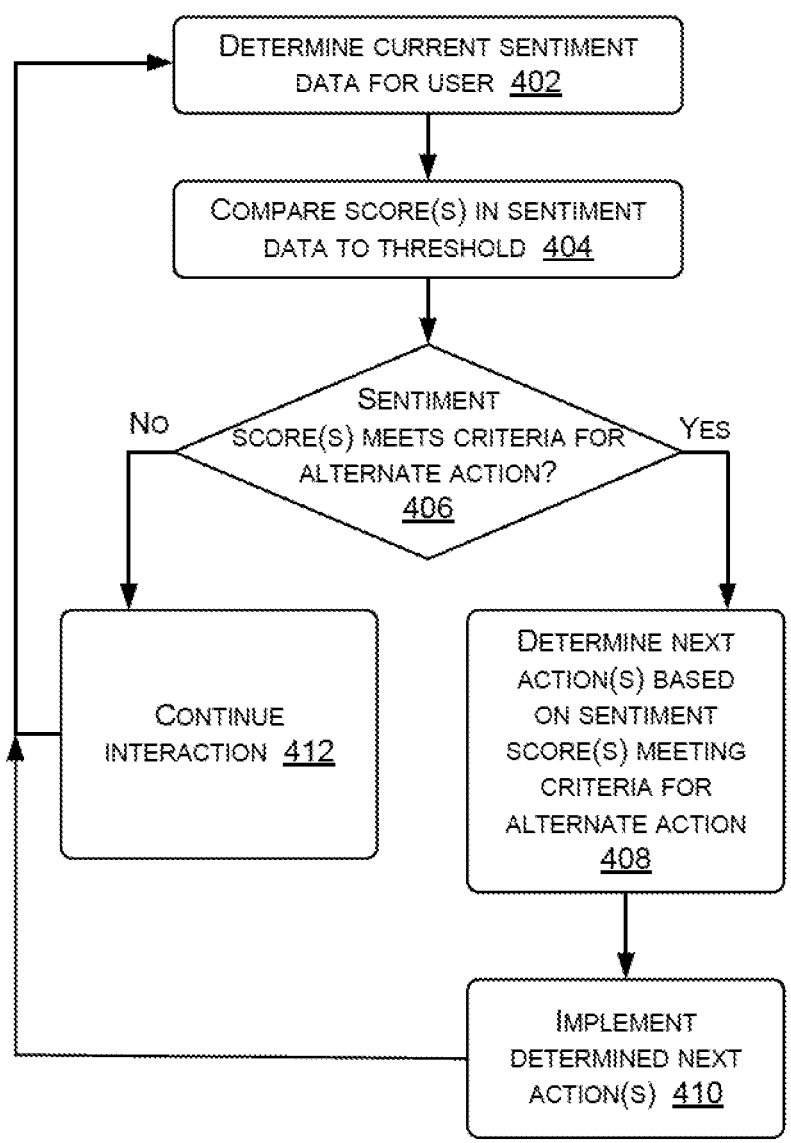
FIG. 4 is a flow diagram illustrating an example process for generating responsive actions based on sentiment analysis data in a sentiment analysis system, in accordance with examples of the disclosure.

FIG. 4 illustrates an exemplary process 400 for determining one or more actions based on sentiment data that may be implemented at a sentiment analysis system such as that described herein. At 402, current sentiment data for a particular user may be determined. This may be current sentiment data determined as described herein and/or may be current sentiment data for a particular issue associated with a user. The current sentiment data may include one or more numerical sentiment scores.

At 404, the system may compare one or more of the sentiment scores to one or more thresholds. In examples, thresholds may be determined and/or preconfigured that may be associated with particular actions and/or other operations. For example, a sentiment score that falls below a threshold may trigger a notification to a supervisor, manager, agent, or other escalation personnel. In another example, a sentiment score that falls below a threshold may set or adjust a reminder timer (e.g., to send a reminder to follow up with the user sooner or within a period of time). In another example, a sentiment score that is below or above a threshold may trigger the generation and/or transmission of a customer satisfaction survey. In another example, a sentiment score that is below or above a threshold may generate a notification to use a different channel of communications for the next communications. Any other actions may be triggered by a threshold detection, and all such actions are contemplated as within the scope of the instant disclosure.

At 406, the system may determine whether the compared sentiment score(s) of 404 meets the criteria from an alternate action (e.g., meets or exceeds a corresponding threshold, falls below a corresponding threshold, etc.). If not, at 412, the interaction may be facilitated as it has been and/or no action may be taken. The process may return to 402 to perform further evaluations of sentiment as needed.

If, at 406, the system determines that the compared sentiment score(s) of 404 meets the criteria from an alternate action, at 408, the system may determine the particular one or more actions to be implemented (e.g., determine follow-up time, determine next channel of communication to be used, notify manager, etc.). At 410, the determined action(s) may be taken and the process may return to 402 to perform further evaluations of sentiment as needed.

Figure 5:
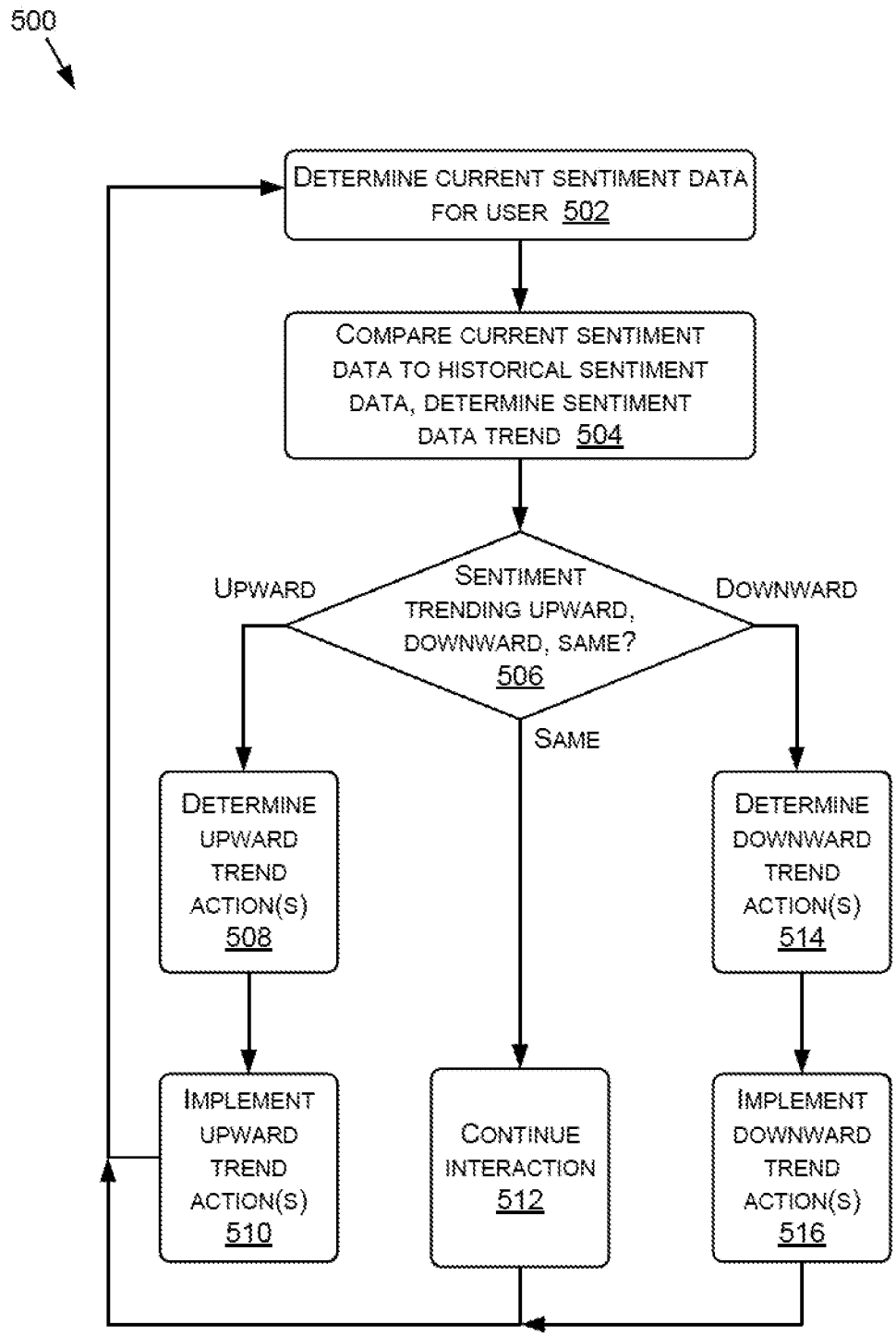
FIG. 5 is a flow diagram illustrating another example process for generating responsive actions based on sentiment analysis data in a sentiment analysis system, in accordance with examples of the disclosure.

FIG. 5 illustrates an exemplary process 500 for determining one or more actions based on sentiment data trends that may be implemented at a sentiment analysis system such as that described herein. At 502, current sentiment data for a particular user may be determined. This may be current sentiment data determined as described herein and/or may be current sentiment data for a particular issue associated with a user. The current sentiment data may include one or more numerical sentiment scores.

At 504, the system may compare one or more of the sentiment scores in current sentiment data to historical sentiment data to determine a sentiment data trend. For example, the current sentiment data may show an increase or decrease in sentiment when compared to previous sentiment data. In examples, current sentiment data may be compared to the most recently determined previous sentiment data. In other examples, a trend over a past amount of time and/or since the initiation of collection of sentiment data for this particular issue and/or user may be compared to the current sentiment data. These determined trends in sentiment data may be associated with particular actions and/or other operations. For example, a sentiment trend that (e.g., suddenly or abruptly) turns downward (e.g., sentiment numerically decreases) may trigger a notification to a supervisor, manager, agent, or other escalation personnel. In another example, a sentiment trend that rises or falls may trigger the setting or adjustment of a reminder timer (e.g., to send a reminder to follow up with the user sooner when the trend goes downward or later when the trend goes upward). In another example, a sentiment trend may generate a notification to use a different channel of communications for the next communications (e.g., if trending downward for a threshold period of time, trigger a voice call as the next communication; if trending upward for a threshold period of time, trigger a text message or email as the next communication). Any other actions may be triggered by a trend or a change in trend, and all such actions are contemplated as within the scope of the instant disclosure.

At 506, the system may determine whether the determined trend of 504 is moving upward, downward, or remaining substantially the same. If, at 506, the system determines that sentiment is in an upward trend, at 508, the system may determine the particular one or more actions to be implemented for upward trends. At 510, the determined action(s) may be taken and the process may return to 502 to perform further sentiment trend evaluations as needed. If, at 506, the system determines that the sentiment trend is largely unchanged, at 512, the system may determine to continue with current interaction operations and the process may return to 502 to perform further sentiment trend evaluations as needed. If, at 506, the system determines that sentiment is in a downward trend, at 514, the system may determine the particular one or more actions to be implemented for downward trends. At 516, the determined action(s) may be taken and the process may return to 502 to perform further sentiment trend evaluations as needed.

Figure 6:
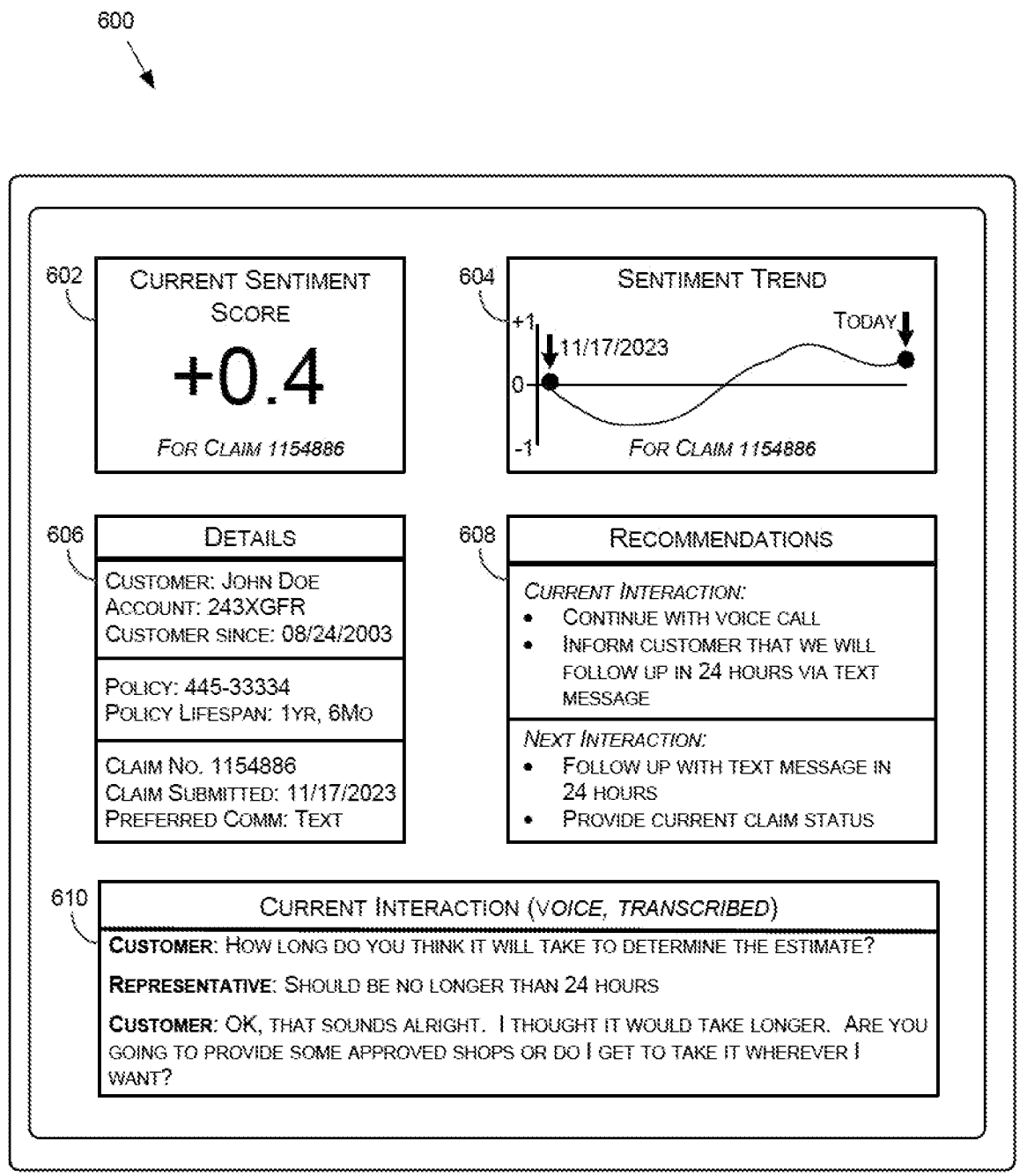
FIG. 6 is a block diagram of an exemplary graphical user interface that may be generated by or under instruction from a sentiment analysis system, in accordance with examples of the disclosure.

FIG. 6 illustrates a block diagram of an exemplary interface 600 that may be generated by a sentiment analysis system. In examples, a sentiment analysis system may generate a plurality of instructions that may be transmitted to an application, such as an interaction application that may be executing in a web browser executing on a computing device. The plurality of instructions may include an instruction to generate one or more data display elements and/or one or more control elements on a graphical user interface that may present data described herein and/or initiate operations as described herein. Such displays and operations may further be based on the state of memory at the computing device associated with the interface application and/or the web browser. The plurality of instructions may be provided via an interface, such as an application programming interface (API).

The interface 600 may include an interface element 602 that may be populated with sentiment data. For example, the interface element 602 may present a current sentiment score retrieved from memory (e.g., browser memory) where it may have been stored upon receipt from a sentiment analysis system. The element 602 may further present additional data, such as an identifier of an issue and/or user associated with the sentiment score shown that may be similarly retrieved from memory after receipt from a sentiment analysis system and stored in such memory.

The interface 600 may also, or instead, include an interface element 604 that may be populated with sentiment trend data. For example, the interface element 604 may present a graphical representation of a sentiment trend over a period of time. The representation may include indications of a starting date and/or time for the trend and ending (e.g., current) date and/or time of the trend. The trend representation may be generated using sentiment data and/or sentiment trend data that may be retrieved from memory (e.g., browser memory) where it may have been stored upon receipt from a sentiment analysis system. The element 604 may further present additional data, such as an identifier of an issue and/or user associated with the sentiment trend shown that may be similarly retrieved from memory after receipt from a sentiment analysis system and stored in such memory. The trend may be presented with a scale or other graphical representations of potential sentiment values to facilitate ease of interpretation.

The interface 600 may also, or instead, include an interface element 606 that may be populated with sentiment-related data, such as user, issue, and/or preference data. For example, the interface element 606 may present a graphical representation of user-related information (e.g., account number, customer history, policy number, policy lifespan, etc.), issue-related information (e.g., claim number, claim initiated date, claim contact preference, etc.), and so forth.

The interface 600 may also, or instead, include an interface element 608 that may be populated with sentiment-related action data. For example, the interface element 608 may present a graphical representation of recommended actions to be taken determined as described herein. For example, the actions illustrated in element 608 may include actions determined based on a sentiment score, a change in sentiment score, a sentiment score trend, and/or a change in a sentiment score trend. In this example, such actions may include actions regarding the current interaction (e.g., "continue with voice call") and/or actions regarding subsequent interactions (e.g., "follow up with text message in 24 hours"). Such actions may be generated by an application using sentiment data and/or sentiment trend data that may be retrieved from memory (e.g., browser memory) where it may have been stored upon receipt from a sentiment analysis system. Alternatively or additionally such actions may be retrieved from memory (e.g., browser memory) where they may have been stored upon receipt from a sentiment analysis system.

The interface 600 may also, or instead, include an interface element 610 that may be populated with current (e.g., ongoing and/or most recent) interaction data. For example, the element 610 may present a transcription of a voice call. Alternatively, the element 610 may present the text of an ongoing text communications session (e.g., text messages, chat, social media messaging, etc.). The data used to populate the interface element 610 may be retrieved from memory (e.g., browser memory) where it may have been stored upon receipt from a communications component of a sentiment analysis system. Alternatively, an application executing on the computing device presenting the interface 600 may perform communications operations and provide the communications exchanged to a communications component of a sentiment analysis system.

Figure 7:
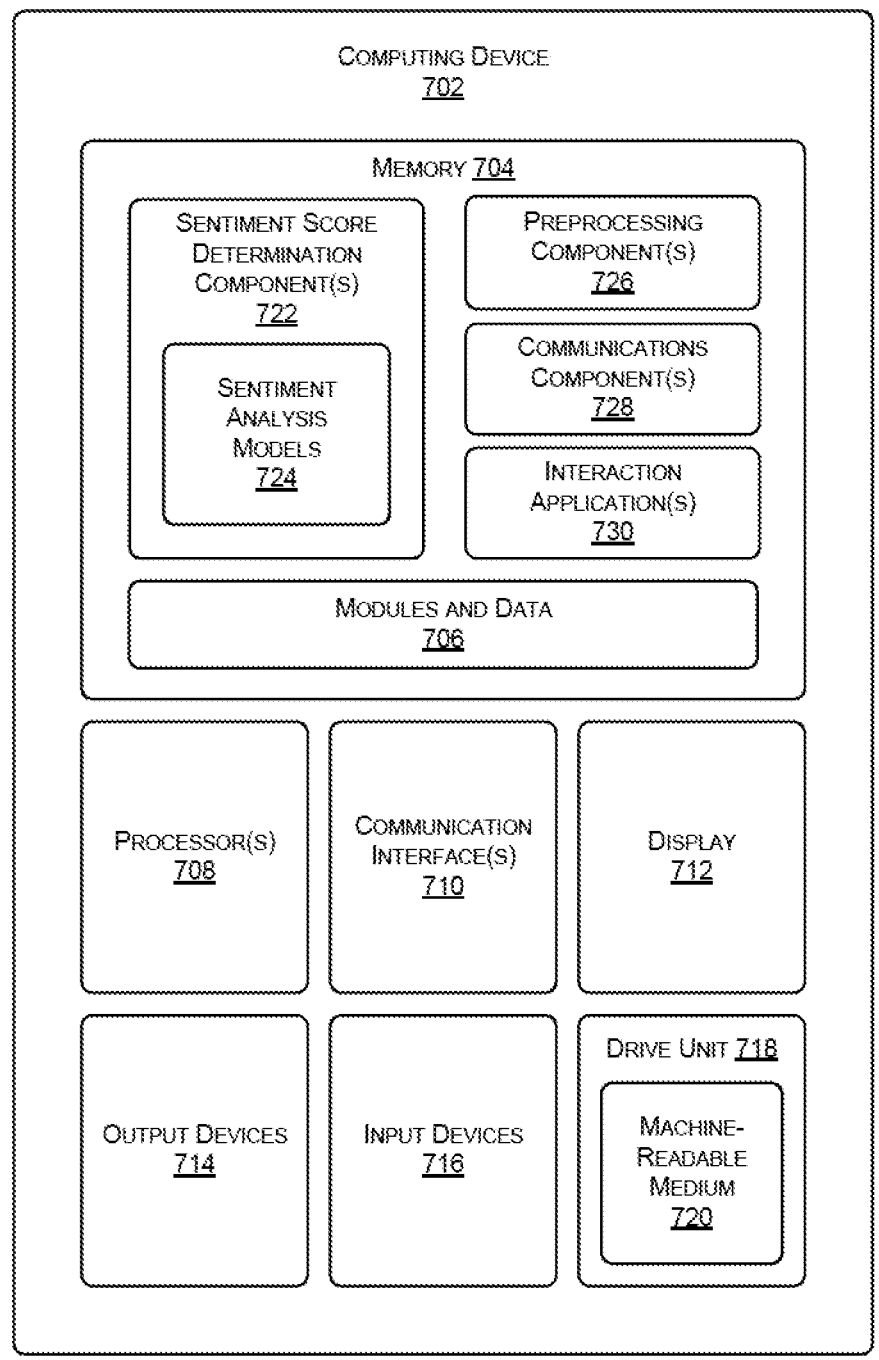
FIG. 7 shows an example system architecture for a computing device associated with a sentiment analysis system and any associated component.

FIG. 7 shows an example system architecture 700 for a computing device 702 associated with the sentiment analysis system described herein. The computing device 702 can be a server, computer, or other type of computing device that executes one or more portions of a sentiment analysis system, such as a preprocessing function, a machine-learned and/or results-based model training system, a sentiment analysis rules-based model, a sentiment analysis machine-learned model, other models of any type, and/or any other components or portions of a sentiment analysis system. In some examples, elements of the sentiment analysis system can be distributed among, and/or be executed by, multiple computing devices similar to the computing device shown in FIG. 7. For example, a preprocessing function may execute on a different computing device than a sentiment analysis model.

The computing device 702 can include memory 704. In various examples, the memory 704 can include system memory, which may be volatile (such as RAM), non-volatile (such as ROM, flash memory, etc.) or some combination of the two. The memory 704 can further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device 702 associated with the sentiment analysis system. Any such non-transitory computer-readable media may be part of the computing device 702.

The memory 704 can store modules and data 706. The modules and data 706 can include one or more of the preprocessing function, the sentiment analysis model, other models, and/or other elements described herein. Additionally, or alternately, the modules and data 706 can include any other modules and/or data that can be utilized by the sentiment analysis system to perform or enable performing any action taken by the sentiment analysis system. Such other modules and data can include a platform, operating system, and applications, and data utilized by the platform, operating system, and applications. In examples, the memory 704 can store one or more sentiment score determination components 722, which may include one or more sentiment analysis models 724. The memory 704 may also, or instead, store one or more preprocessing components 726, one or more communications components 728, and/or one or more interaction applications 730.

The computing device 702 associated with the sentiment analysis system can also have processor(s) 708, communication interfaces 710, display 712, output devices 714, input devices 716, and/or a drive unit 718 including a machine-readable medium 720.

In various examples, the processor(s) 708 can be a central processing unit (CPU), a graphics processing unit (GPU), both a CPU and a GPU, or any other type of processing unit. Each of the one or more processor(s) 708 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 708 may also be responsible for executing computer applications stored in the memory 704, which can be associated with common types of volatile (RAM) and/or nonvolatile (ROM) memory.

The communication interfaces 710 can include transceivers, modems, interfaces, antennas, telephone connections, and/or other components that can transmit and/or receive data over networks, telephone lines, or other connections.

The display 712 can be a liquid crystal display, or any other type of display commonly used in computing devices. For example, a display 712 may be a touch-sensitive display screen and can then also act as an input device or keypad, such as for providing a soft-key keyboard, navigation buttons, or any other type of input.

The output devices 714 can include any sort of output devices known in the art, such as a display 712, speakers, a vibrating mechanism, and/or a tactile feedback mechanism. Output devices 714 can also include ports for one or more peripheral devices, such as headphones, peripheral speakers, and/or a peripheral display.

The input devices 716 can include any sort of input devices known in the art. For example, input devices 716 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine-readable medium 720 can store one or more sets of instructions, such as software or firmware, that embody any one or more of the methodologies or functions described herein. The instructions can also reside, completely or at least partially, within the memory 704, processor(s) 708, and/or communication interface(s) 710 during execution thereof by the computing device 702 associated with the sentiment analysis system. The memory 704 and the processor(s) 708 also can constitute machine-readable media 720.

Overall, one or more rules-based, machine-learning, and/or machine-learned models can be trained to perform sentiment analysis on a text communications exchange and generate sentiment determinations and/or scores that may more accurately reflect a sentiment for one or more text communications exchanges. For example, as described herein, a sentiment analysis model may be executed using data associated with a text communications exchange as input to generate a sentiment score and/or other sentiment-associated data as output. This sentiment output may be more likely to reflect actual user sentiment regarding a communications exchange, thereby facilitating faster service to the user and reducing the utilization of processing, memory, and network resources that would have been wasted using lower complexity systems and less efficient and/or manual sentiment analysis.

Accordingly, by more accurately and efficiently determining sentiment associated with a communications exchange, delays and inefficiencies associated with addressing claims and other user issues may be avoided. For example, network bandwidth usage, processing cycles, memory usage, and/or other computing resources associated with repeated user interactions based on misunderstood and/or unrealized user sentiment may be reduced or eliminated by addressing the associated issues more appropriately based on more complete sentiment awareness.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:
1. A method, comprising:
receiving, by an instruction generation system, unstructured textual data and metadata associated with a text communications exchange between a first computing device and a second computing device;

preprocessing the unstructured textual data and metadata at the instruction generation system by:
  determining, based at least in part on the metadata, one or more portions of the unstructured textual data originating with the first computing device; and
  generating, based at least in part on the one or more portions of the unstructured textual data originating with the first computing device, machine-learned model input data by removing extraneous data from the one or more portions of the unstructured textual data originating with the first computing device and tokenizing the one or more portions of the unstructured textual data originating with the first computing device;
executing, at the instruction generation system, a machine-learned model using the machine-learned model input data as input to generate operator data as output; and
transmitting, from the instruction generation system to the second computing device, instructions to generate an interface at the second computing device, the interface comprising an interface element comprising a graphical representation of the operator data.

2. The method of claim 1, wherein the machine-learned model comprises one or more of a large language model or a convolutional neural network.

3. The method of claim 1, further comprising transmitting, from the instruction generation system to the second computing device, second instructions to generate a second interface element at the interface based at least in part on the operator data.

4. The method of claim 3, wherein the second instructions comprise instructions to present one or more communications channels associated with one or more subsequent communications exchanges between the first computing device and the second computing device.

5. The method of claim 1, further comprising:
  determining, by the instruction generation system, an operator data trend based at least in part on the operator data; and
  transmitting, from the instruction generation system to the second computing device, second instructions to generate a second interface element at the interface, the second interface element comprising a second graphical representation of the operator data trend.

6. The method of claim 5, further comprising transmitting, from the instruction generation system to the second computing device, second instructions to generate a third interface element at the interface based at least in part on the operator data trend, the third interface element comprising data representing one or more actions determined based at least in part on the operator data trend.

7. The method of claim 1, further comprising:
  generating aggregated operator data based at least in part on the operator data and historical operator data; and
  transmitting, from the instruction generation system to the second computing device, second instructions to generate a second interface element at the interface based at least in part on the aggregated operator data.

8. A non-transitory computer-readable medium comprising instructions that, when executed by one or more processors executing on an instruction generation system configured in a computing environment, cause the one or more processors to perform operations comprising:
  receiving, by the instruction generation system, unstructured textual data and metadata associated with a text communications exchange between a first computing device and a second computing device;
  preprocessing the unstructured textual data and metadata at the instruction generation system by:
    determining, based at least in part on the metadata, one or more portions of the unstructured textual data originating with the first computing device; and
    generating, based at least in part on the one or more portions of the unstructured textual data originating with the first computing device, machine-learned model input data by removing extraneous data from the one or more portions of the unstructured textual data originating with the first computing device and tokenizing the one or more portions of the unstructured textual data originating with the first computing device;
  executing, at the instruction generation system, a machine-learned model using the machine-learned model input data as input to generate operator data as output; and
  transmitting, from the instruction generation system to the second computing device, instructions to generate an interface at the second computing device, the interface comprising an interface element comprising a graphical representation of the operator data.

9. The non-transitory computer-readable medium of claim 8, wherein the machine-learned model comprises one or more of a large language model or a convolutional neural network.

10. The non-transitory computer-readable medium of claim 8, wherein the operations further comprise transmitting, from the instruction generation system to the second computing device, second instructions to generate a second interface element at the interface based at least in part on the operator data.

11. The non-transitory computer-readable medium of claim 10, wherein the second instructions comprise instructions to present one or more communications channels associated with one or more subsequent communications exchanges between the first computing device and the second computing device.

12. The non-transitory computer-readable medium of claim 8, wherein the operations further comprise:
  determining, by the instruction generation system, an operator data trend based at least in part on the operator data; and
  transmitting, from the instruction generation system to the second computing device, second instructions to generate a second interface element at the interface, the second interface element comprising a second graphical representation of the operator data trend.

13. The non-transitory computer-readable medium of claim 12, wherein the operations further comprise transmitting, from the instruction generation system to the second computing device, second instructions to generate a third interface element at the interface based at least in part on the operator data trend, the third interface element comprising data representing one or more actions determined based at least in part on the operator data trend.

14. The non-transitory computer-readable medium of claim 8, wherein the operations further comprise:
  generating aggregated operator data based at least in part on the operator data and historical operator data; and
  transmitting, from the instruction generation system to the second computing device, second instructions to generate a second interface element at the interface based at least in part on the aggregated operator data.

15. An instruction generation system, comprising:
one or more processors executing in a computing environment; and
a non-transitory memory storing computer-executable instructions that, when executed, cause the one or more processors to perform operations comprising:
receiving unstructured textual data and metadata associated with a text communications exchange between a first computing device and a second computing device;
preprocessing the unstructured textual data and metadata at the instruction generation system by:
determining, based at least in part on the metadata, one or more portions of the unstructured textual data originating with the first computing device; and
generating, based at least in part on the one or more portions of the unstructured textual data originating with the first computing device, machine-learned model input data by removing extraneous data from the one or more portions of the unstructured textual data originating with the first computing device and tokenizing the one or more portions of the unstructured textual data originating with the first computing device;
executing a machine-learned model using the machine-learned model input data as input to generate operator data as output; and
transmitting, to the second computing device, instructions to generate an interface at the second computing device, the interface comprising an interface element comprising a graphical representation of the operator data.

16. The instruction generation system of claim 15, wherein the operations further comprise:
determining, by the instruction generation system, an operator data trend based at least in part on the operator data; and
transmitting, from the instruction generation system to the second computing device, second instructions to generate a second interface element at the interface, the second interface element comprising a second graphical representation of the operator data trend.

17. The instruction generation system of claim 16, wherein the operations further comprise transmitting, from the instruction generation system to the second computing device, second instructions to generate a third interface element at the interface based at least in part on the operator data trend, the third interface element comprising data representing one or more actions determined based at least in part on the operator data trend.

18. The instruction generation system of claim 15, wherein the operations further comprise:
generating aggregated operator data based at least in part on the operator data and historical operator data; and
transmitting, from the instruction generation system to the second computing device, second instructions to generate a second interface element at the interface based at least in part on the aggregated operator data.

19. The instruction generation system of claim 15, wherein the operations further comprise:
determining one or more actions based at least in part on the operator data; and
transmitting, from the instruction generation system to the second computing device, second instructions to generate a second interface element at the interface, the second interface element comprising data representing the one or more actions.

20. An instruction generation system, comprising:
means for receiving unstructured textual data and metadata associated with a text communications exchange between a first computing device and a second computing device;
means for preprocessing the unstructured textual data and metadata at the instruction generation system by:
determining, based at least in part on the metadata, one or more portions of the unstructured textual data originating with the first computing device; and
generating, based at least in part on the one or more portions of the unstructured textual data originating with the first computing device, machine-learned model input data by removing extraneous data from the one or more portions of the unstructured textual data originating with the first computing device and tokenizing the one or more portions of the unstructured textual data originating with the first computing device;
means for executing a machine-learned model using the machine-learned model input data as input to generate operator data as output; and
means for transmitting, to the second computing device, instructions to generate an interface at the second computing device, the interface comprising an interface element comprising a graphical representation of the operator data.

* * * * *